US009565084B2

(12) United States Patent
Bakshi et al.

(10) Patent No.: US 9,565,084 B2
(45) Date of Patent: Feb. 7, 2017

(54) METHOD AND SYSTEM FOR EVALUATING NETWORK CONNECTIVITY IN RULE-BASED APPLICATIONS

(75) Inventors: Yury Bakshi, Morganville, NJ (US); Carolyn Roche Johnson, Holmdel, NJ (US); Herbert Shulman, Colts Neck, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1243 days.

(21) Appl. No.: 12/339,650

(22) Filed: Dec. 19, 2008

(65) Prior Publication Data

US 2010/0157816 A1    Jun. 24, 2010

(51) Int. Cl.
*H04L 12/26*    (2006.01)

(52) U.S. Cl.
CPC .................... *H04L 43/0811* (2013.01)

(58) Field of Classification Search
CPC .. H04L 43/0811; H04L 43/0805; H04L 43/08; H04W 76/02; H04W 28/0257
USPC .............. 370/356, 351, 401, 228, 216–218, 242,370/244, 248, 250, 254–255; 455/433; 709/224
See application file for complete search history.

(56) References Cited

U.S. PATENT DOCUMENTS

| 4,864,563 | A | 9/1989 | Pavey et al. |
| 7,050,404 | B1 | 5/2006 | Devlin |
| 7,313,613 | B1 | 12/2007 | Brooking et al. |
| 7,724,655 | B2 * | 5/2010 | Saleh ...................... H04L 45/02 370/228 |
| 2003/0137932 | A1 * | 7/2003 | Nishioka et al. ............. 370/216 |
| 2003/0147352 | A1 * | 8/2003 | Ishibashi et al. ............. 370/248 |
| 2004/0018839 | A1 * | 1/2004 | Andric et al. ................ 455/433 |
| 2005/0169239 | A1 * | 8/2005 | Knees et al. ................. 370/351 |
| 2006/0268742 | A1 * | 11/2006 | Chu et al. ..................... 370/254 |
| 2007/0078970 | A1 * | 4/2007 | Zabihi et al. ................. 709/224 |
| 2007/0153674 | A1 * | 7/2007 | Alicherry et al. ............ 370/216 |
| 2007/0177525 | A1 * | 8/2007 | Wijnands et al. ............ 370/254 |
| 2007/0211703 | A1 * | 9/2007 | Gu et al. ....................... 370/356 |
| 2008/0151916 | A1 * | 6/2008 | Jetcheva et al. ............. 370/401 |

* cited by examiner

*Primary Examiner* — Kwang B Yao
*Assistant Examiner* — Syed M Bokhari
(74) *Attorney, Agent, or Firm* — Fay Kaplun & Marcin, LLP

(57) ABSTRACT

A computer readable storage medium includes a set of instructions executable by a processor. The instructions are operable to assign a unique identifier to each of a plurality of node subsets of a network, the node subsets being created by damage to the network; assign one or more of the identifiers to each of a plurality of components of the damaged network based on a connectivity to the one or more of the node subsets and corresponding identifiers of the node subsets; assign one or more of the identifiers to each of one or more node types of the plurality of components by assigning each of the node types all of the identifiers of any of the components of the node type; and evaluate a first connectivity between a first one of the components and a second one of the components by determining whether they share at least one of the identifiers.

20 Claims, 4 Drawing Sheets

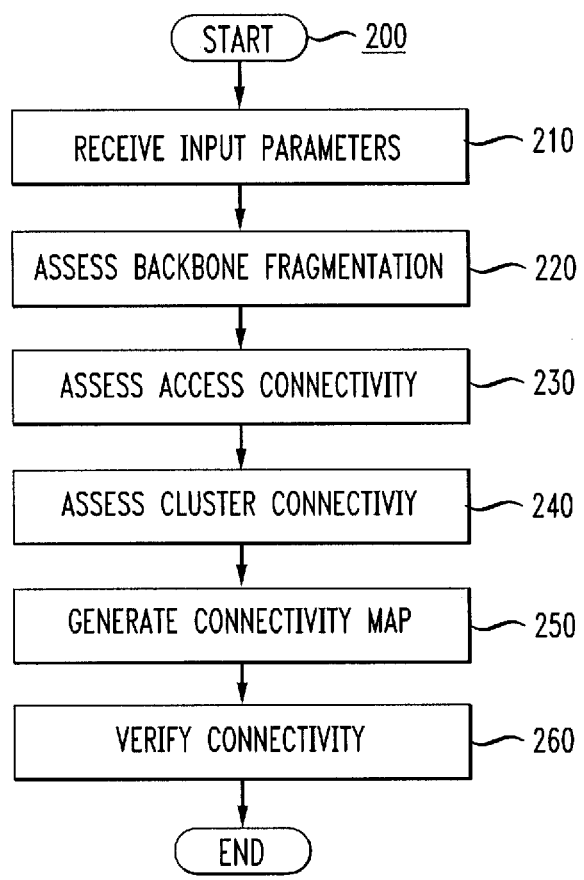

METHOD AND SYSTEM FOR EVALUATING NETWORK CONNECTIVITY IN RULE-BASED APPLICATIONS

BACKGROUND

Modern telecommunications networks typically comprise complicated, interconnected networks of nodes and links. Network providers strive to provide service to their customers both during normal operations and during situations when the network is damaged, either moderately or severely. In order to insure that service can be provided in situations when a network is damaged, providers may use modeling algorithms to analyze various possible failure scenarios. Because networks with large numbers of components may have a significantly larger number of failure scenarios, such modeling algorithms should be as simple as possible in order for them to execute quickly and thus be able to model complicated systems in a reasonable amount of time.

SUMMARY OF THE INVENTION

The present invention is directed to a computer readable storage medium including a set of instructions executable by a processor. The instructions are operable to assign a unique identifier to each of a plurality of node subsets of a network, the node subsets being created by damage to the network; assign one or more of the identifiers to each of a plurality of components of the damaged network based on a connectivity to the one or more of the node subsets and corresponding identifiers of the node subsets; assign one or more of the identifiers to each of one or more node types of the plurality of components by assigning each of the node types all of the identifiers of any of the components of the node type; and evaluate a first connectivity between a first one of the components and a second one of the components by determining whether they share at least one of the identifiers.

The present invention is further directed to a system including a memory and a processor. The memory stores a representation of a plurality of network components. The processor is configured to assign an identifier to each of a plurality of node subsets of the network components, the node subsets comprising undamaged nodes of the network. The processor is further configured to assign one or more of the identifiers to other network components based on a connectivity to the one or more node subsets and assign one or more of the identifiers to each of one or more node types of the other network components based on the identifiers assigned to each of the other network components in each of the node types. The processor is further configured to evaluate a connectivity between a first one of the other network components and a second one of the other network components by determining whether they share at least one of the identifiers.

BRIEF DESCRIPTION OF THE DRAWINGS

FIG. 2 shows an exemplary embodiment of a method according to the present invention.

DETAILED DESCRIPTION

Figure 1A:
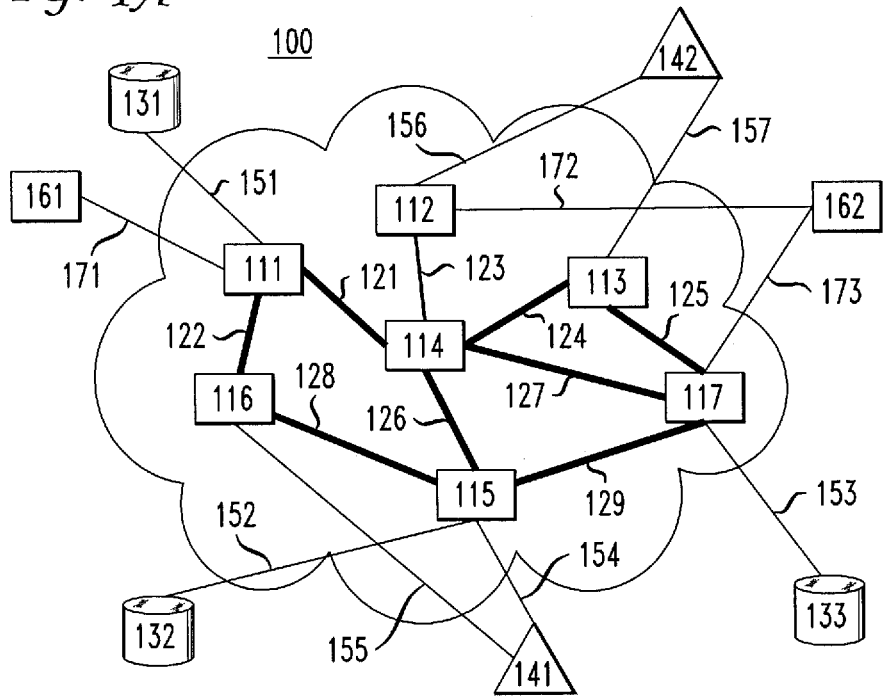
FIG. 1a shows an exemplary communications network that may be modeled by the exemplary elements of the present invention.

The exemplary embodiments of the present invention may be further understood with reference to the following description and the appended drawings, wherein like elements are referred to with the same reference numerals. The exemplary embodiments describe methods and systems for modeling connectivity between multiple end points attached to a network that is subjected to multiple failures.

It should initially be noted that the principles of the present invention are broadly applicable to any collection of nodes and links that can be divided into subsets of nodes with associated routing rules and logic for connectivity between subsets of nodes to accomplish a function for end users, and for which it may thus be necessary to verify the existence of a path between one or more pairs of nodes. This may include a Voice Over Internet Protocol ("VoIP") network, an IP data network, a communications network, a transportation network, a social network, an interactive gaming network, etc. Thus, while the specific nodes described and analyzed for the exemplary embodiments will be those appropriate to a VoIP network, the exemplary methods and systems may be equally applicable to any other type of problem involving a need to validate connectivity between multiple end points attached to a common network or other type of graph.

Providers of communication networks employ various modeling techniques to evaluate network survivability under a variety of hypothetical damage/outage scenarios. The total number of scenarios that must be analyzed is often extremely large. For example, in a network with 25 nodes and 100 links, there are over 10,000,000 different combinations involving the failure of one, two, three or four links or nodes. Further, for each scenario, the connectivity between a large number of equipment pairs must be analyzed. For example, in a network with 1,000 users, an assessment of connectivity between all user pairs requires analysis of roughly 1,000,000 pairs of users. Additionally, more complex call flows, which may involve network validation, routing, and service processing equipment, require connectivity analysis for an even larger number of pairs of end points. Thus, it is extremely important to enhance the speed of the modeling of such networks. Faster modeling may enable more failure scenarios to be analyzed, resulting in more accurate survivability evaluations.

FIG. 1a illustrates an exemplary communication network 100 in an undamaged state. As stated above, the exemplary network 100 is a VoIP network. The elements described herein will therefore be those appropriate to this type of network, but as stated above, the broader principles of the invention may be equally applicable to other types of networks. The network 100 includes seven backbone nodes 111, 112, 113, 114, 115, 116 and 117. These nodes may be, for example, backbone routers. The backbone nodes 111-117 are connected to one another by nine backbone links 121, 122, 123, 124, 125, 126, 127, 128 and 129, shown on FIG. 1a as thick solid lines. These may be, for example, high-capacity data links.

The exemplary network 100 also includes three data routing nodes 131, 132 and 133. The routing nodes 131-133 may facilitate data routing to and from users connected to the network. Additionally, the exemplary network 100 includes two call processing nodes 141 and 142, which may perform various tasks relating to call processing. The data routing nodes 131-133 and call processing nodes 141-142 are connected to the backbone nodes via access links 151, 152, 153, 154, 155, 156 and 157. The access links 151-157 may typically be lower-capacity than the background links 121-129. Those of skill in the art will understand that the precise number and relationship of the various components shown in the network 100 of FIG. 1*a* is only exemplary, and that the number, relationship and function of components and links in other networks may be significantly greater than shown and may vary from network to network.

Typically, a VoIP call may require connectivity to different network nodes. A call placed by a first user to a second user may require that the first user connect to a routing node (e.g., data routing nodes 131-133), then to a processing node (e.g., call processing nodes 141-142), and finally directly to the second user. FIG. 1*a* further illustrates two such user nodes 161 and 162. These nodes may be, for example, private branch exchanges ("PBX"). The user node 161 is connected to the network 100 via access link 171, which connects it to backbone node 111; the user node 162 is connected to the network 100 via access links 172 and 173, which connect it to backbone nodes 112 and 117 respectively. As above, the access links 171-173 may typically have lower capacity than the backbone links 121-129.

In order to complete a VoIP call between user node 161 and 162 using the exemplary network, three separate connections must be possible; however, it should be noted that this is merely exemplary and that the number and complexity of connections required may vary for other types of communications in other networks. First, the user node 161 must be able to connect to one of the data processing nodes 141-142 via one of the data routing nodes 131-133. This first connection may typically be used to exchange signaling messages, such as session initiation protocol ("SIP") messages, between the call originating user node 161 and the processing and routing nodes. Second, the user node 162 must be able to connect to one of the data routing nodes 131-133. The second connection may typically be used to exchange SIP messages between the routing nodes 131-133 and the call terminating user node 162. Third, a connection must exist between user node 161 and user node 162. This third connection may typically be used to carry media (e.g., voice) packets between the two user nodes.

It will be apparent that a properly designed network that has suffered no damage or outage, as illustrated in FIG. 1*a*, will provide for all necessary connections. In this example, the first connection described above, from the call originating user node to a call processing node via a data routing node, may be established from user node 161 to data routing node 131 via access link 171, backbone node 111 and access link 151, and subsequently from data routing node 131 to call processing node 142 via access link 151, backbone node 111, backbone link 121, backbone node 114, backbone link 123, backbone node 112 and access link 156. It should be noted that other paths between data routing node 131 and call processing node 142 may exist; it will be apparent to those of skill in the art that connectivity will be sufficient so long as one such path exists.

The second connection described above, from a data routing node to the call terminating user node, may be established from data routing node 133 to user node 162 via access link 153, backbone node 117 and access link 173. Finally, the third connection, from the call originating user node 161 to the call terminating user node 162, may be established via access link 171, backbone node 111, backbone link 121, backbone node 114, backbone link 127, backbone node 117 and access link 173. Thus, it may be seen that the undamaged network is sufficient to enable VoIP communications between the user nodes 161 and 162.

Figure 1B:
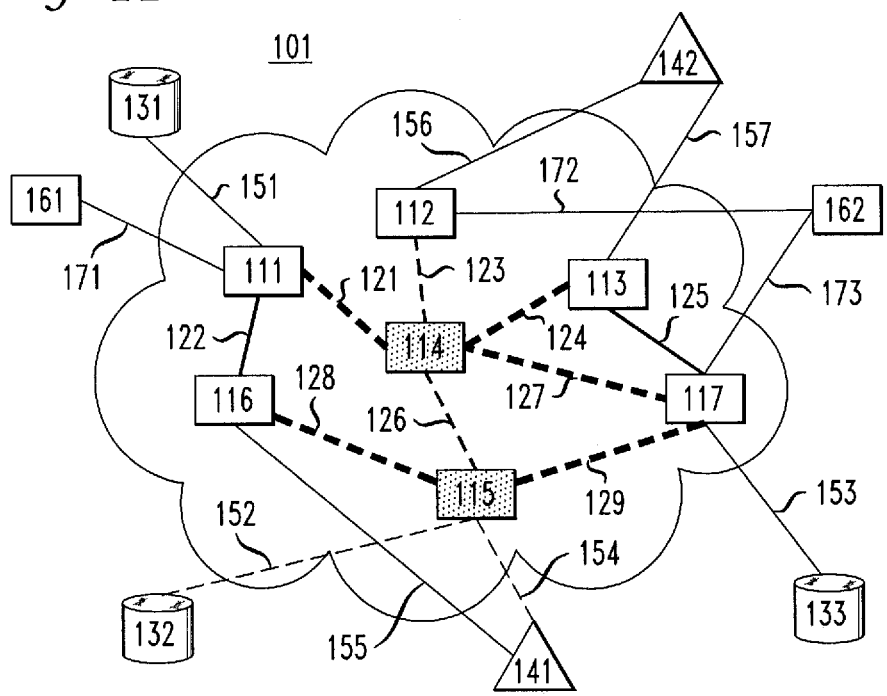
FIG. 1b shows the exemplary communications network of FIG. 1a while experiencing an exemplary failure scenario, which will be used to illustrate the operation of the exemplary embodiments of the present invention.

However, as discussed above, a main goal of the exemplary embodiments is to model situations where a network has suffered damage or outage. Thus, FIG. 1*b* illustrates damaged network 101, which is network 100 in a damaged state. Those of skill in the art will understand that damage may be due to natural disasters (e.g., hurricanes, earthquakes, etc.), due to manmade disasters (e.g., steam pipe explosions, acts of war, etc.), or due to network-related outages (e.g., software failure, power failure, etc.). In damaged network 101, backbone nodes 114 and 115 have suffered damage and are unavailable to handle network traffic. FIG. 1*b* illustrates damaged nodes 114 and 115 grayed out and the links that connect to those nodes (e.g., backbone links 121, 123, 124, 126, 127, 128 and 129; access links 152 and 154) as dashed lines.

FIG. 2 illustrates an exemplary method 200 according to the present invention. The method 200 will be described with reference to the damaged network 101 of FIG. 1*b*. Those of skill in the art will understand that the method 200 represents the evaluation of a single network failure scenario, and that a real-world implementation of the method 200 will repeat as a plurality of possible failure scenarios are evaluated. In step 210, a set of input parameters is received. This may include the composition of the network to be analyzed, the nature and extent of the failure suffered, the connections that need to be verified, etc. In this example, the composition of the damaged network 101 and the three communication links described above as required for VoIP calls may be the input parameters received in step 210.

In step 220, backbone fragmentation is assessed. This may be accomplished using any of the various known algorithms to identify isolated backbone fragments. Only the components of the backbone network are assessed in this step, not the components of the access network. Common examples of algorithms used for this analysis may include minimum spanning tree algorithms such as Kruskal's, Prim's or Sollin's algorithms. These algorithms may typically complete in O(M log N) time or faster, where M is the number of operational (e.g., non-failure) backbone links and N is the number of operational (e.g., non-failure) backbone nodes. Continuing with the example of damaged network 101, any of these algorithms will identify three isolated backbone fragments: a first fragment including backbone nodes 111 and 116, a second including backbone node 112, and a third including backbone nodes 113 and 117.

Figure 1C:
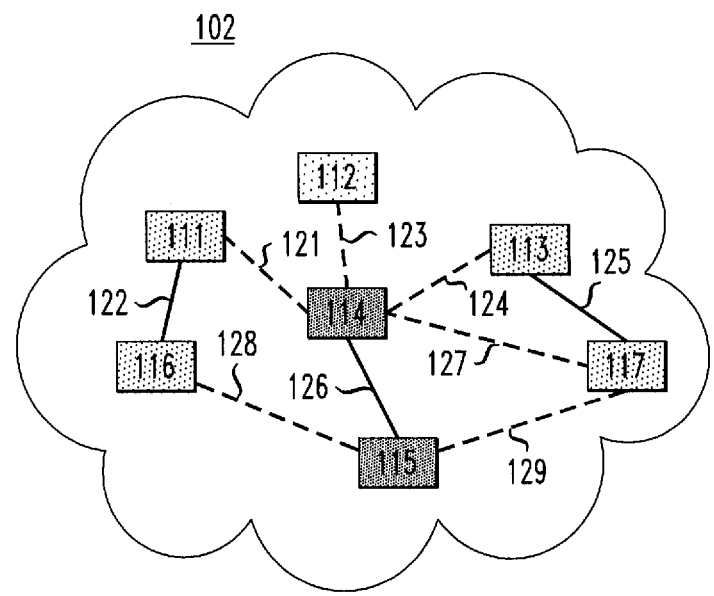
FIG. 1c shows a modified version of the exemplary damaged network of FIG. 1b during the application of the exemplary method of FIG. 2.

Each isolated backbone fragment identified is then assigned a unique identifier. In this example, the unique identifiers are colors, which may be preferable for graphical representations of the fragmented network; however, those of skill in the art will understand that the unique identifiers may also be numbers, letters, words, place designations, network component designations, etc., or any other type of identifier that may be used to distinguish the various isolated backbone fragments from one another. In this example, the first backbone fragment, comprising backbone nodes 111 and 116, is designated as "yellow"; the second, comprising backbone node 112, is designated as "green"; and the third, comprising backbone nodes 113 and 117, is designated as "blue". Damaged backbone nodes 114 and 115 are not assigned an identifier. FIG. 1c illustrates the subset 102 of the damaged network 101 described above. The yellow backbone fragment is indicated in FIG. 1C by diagonal hashing; the green backbone fragment is indicated by vertical hashing; the blue backbone fragment is indicated by horizontal hashing.

In step 230, access connectivity is assessed. In this step, one or more of the unique identifiers given to the backbone fragments in step 220 is assigned to each of the user and service nodes in the damaged system 101. (As above, the example of colors will continue to be used, but those of skill in the art will understand that any other unique identifier may also be used.) This step follows the simple rule that each user and service node (e.g., data routing nodes 131-133, call processing nodes 141-142 and user nodes 161-162) is assigned the identifier of all the backbone nodes that it is directly connected to. User and service nodes may have multiple colors if they are connected to multiple backbone segments, may have one color if they are connected to one backbone segment, or no color if they are connected to no functioning backbone segments.

Figure 1D:
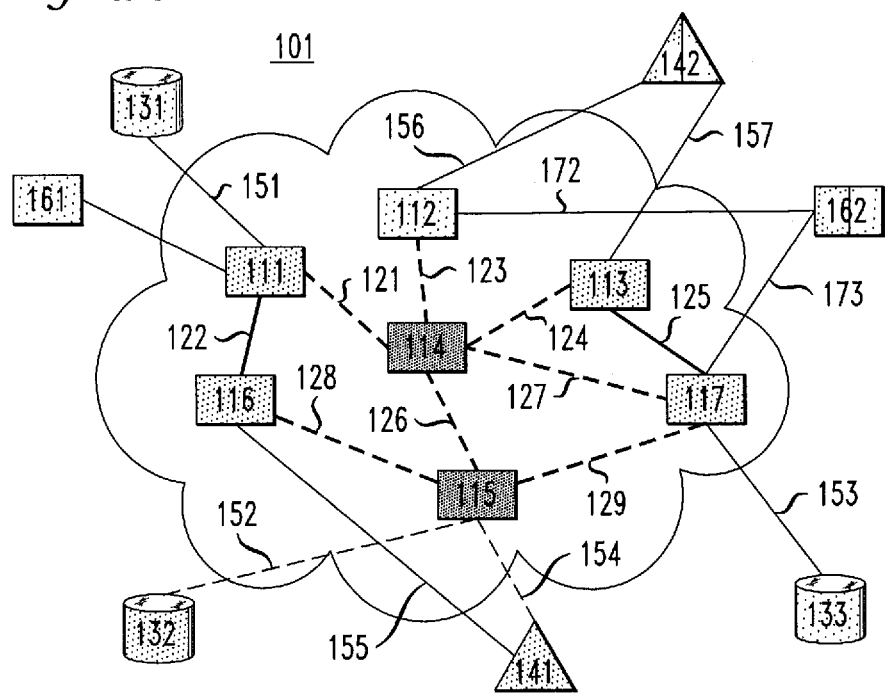
FIG. 1d shows another modified version of the exemplary damaged network of FIG. 1b during the application of the exemplary method of FIG. 2.

Continuing with the damaged network 101, FIG. 1D illustrates components with the unique identifiers assigned in this step. As above, diagonal hashing indicates the yellow backbone fragment, vertical hashing indicates green, and horizontal hashing indicates blue. As will be apparent, data routing node 131, call processing node 141 and user node 161 are connected only to the yellow backbone fragment, while data routing node 133 is connected only to the blue backbone fragment. Call processing node 142 and user node 162 are connected to both the green and blue backbone fragments, while data routing node 132 is not connected to any functioning backbone fragments.

In step 240, cluster connectivity is assessed. The term "service equipment cluster" refers to each of the groups of equipment in the single class. For example, data routing nodes 131-133 represent one service equipment cluster EC1, while call processing nodes 141-142 represent another service equipment cluster EC2. The rule followed is similar to that of the previous step: each service equipment cluster is assigned all colors (or other identifiers) of all service nodes belonging to it. Using the results of step 230, it is apparent that service equipment cluster EC1 is designated as yellow and blue (e.g., data routing node 131 is yellow and data routing node 133 is blue), while service equipment cluster EC2 is designated as yellow, green and blue (e.g., call processing node 141 is yellow and call processing node 142 is green and blue).

Figure 1E:
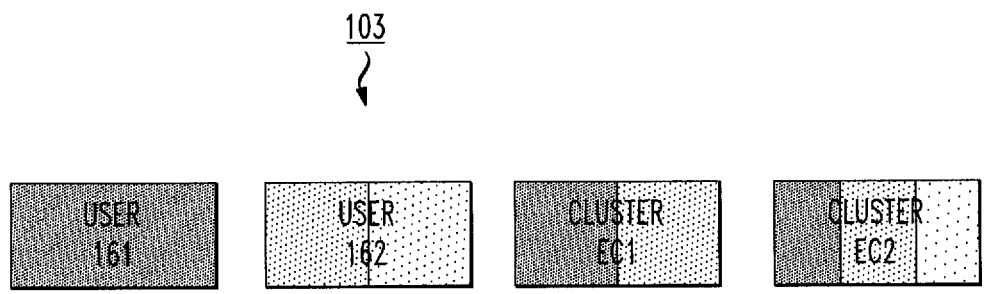
FIG. 1e shows an exemplary connectivity map representing the exemplary damaged network of FIG. 1b.

In step 250, a connectivity map 103 is generated. The connectivity map 103 corresponding to the damaged network 101 is illustrated in FIG. 1E. As above, diagonal hashing indicates the yellow backbone fragment, vertical hashing indicates green, and horizontal hashing indicates blue. The map 103 includes a "box" with one or more colors representing each of the users 161 and 162 and equipment clusters EC1 and EC2. This step eliminates the topology of the network and replaces it with a simple representation that contains all necessary information required to verify connectivity, which was extracted during the prior steps 220-240. It will be apparent that the connectivity map 103 presents a significantly simpler representation of the fragmented network than the representations in FIGS. 1B-1D, and may be different for each failure scenario to be modeled.

The use of the connectivity map 103 may greatly simplify the determination of connectivity between any combination of nodes, and thus, may make it easy to determine if (for an exemplary embodiment involving VoIP communications) calls can be completed. All that is required in order to accomplish such verification is to verify the existence of at least one common color for the combination of user nodes and equipment clusters for each modeled call. The existence of a common color symbolically represents the existence of a network fragment through which a connection may be accomplished. The specific connectivity path is not determined, as this is extraneous to the present invention; it simply determines if such a connectivity path exists.

In step 260, connectivity is verified. Performance of this step requires the cluster connectivity assessments from step 240, as well as user node connectivity from step 230, as summarized by the connectivity map generated in step 250 and illustrated in FIG. 1E. As discussed above, verification of connectivity for an exemplary VoIP call requires three connections to be established: (1) a connection between user node 161 and a node in cluster EC2 via a node in cluster EC1; (2) a connection between a node in cluster EC1 and user node 162; and (3) a connection between user node 161 and user node 162. Each of these connections may be verified using the unique segment identifiers (e.g., colors) established and assigned above. Verification may proceed as follows; those of skill in the art will understand that the verification process described is specific to exemplary VoIP communications, and that other types of communication or other networks may require that different connections be verified; such situations may be evaluated using similar methods.

For the first connection to be verified (e.g., between user node 161 and cluster EC2 via cluster EC1), there must be at least one common color shared by user node 161, cluster EC2, and cluster EC1. This connection exists in this example, as can be seen from FIG. 1E, as user node 161, data routing node 131, and call processing node 141 share the common color yellow. More specifically, it can be seen that user node 161 can connect to data routing node 131 via access link 171, backbone node 111 and access link 151; subsequently, data routing node can connect to call processing node via access link 151, backbone node 111, backbone link 122, backbone node 116 and access link 155. Thus, the first connection is verified for this failure scenario. However, it should be noted that determination of the specific connection path is outside the scope of this invention, which is merely concerned with verifying that such a path exists; the description of the specific path above is provided only for purposes of illustration.

Similarly, for the second connection to be verified (e.g., between cluster EC1 and user node 162), there must be at least one common cluster shared by cluster EC1 and user node 162. As can be seen from FIG. 1E, cluster EC1 and user node 162 share the common color blue. The existence of the common color verifies the connection for this failure scenario. Although, as described above, discovering the specific connection path is beyond the scope of the present invention, it is noted for illustration that this symbolizes the existence of a pathway from data routing node 133 and user node 162 via access link 153, backbone node 117 and access link 173.

Finally, for the third connection to be verified (e.g., between user node 161 and user node 162), the two user nodes must share a common color. However, as can be seen from FIG. 1E, no such common color exists; user node 161 is yellow, while user node 162 is green and blue. Accordingly, the third connection does not exist for this failure scenario (e.g., no common backbone fragment connecting user nodes 161 and 162 exists). Because this is the case, the method concludes that a VoIP call from user node 161 to user node 162 cannot be completed during a failure scenario including a simultaneous outage of backbone nodes 114 and 115.

As previously stated, the exemplary method 200 of FIG. 2 represents the analysis of a single failure condition. However, the exemplary method 200 allows for improved performance time over prior methods for similar analysis of large numbers of failure conditions and for networks involving large numbers of nodes and links because the above method may be repeated for numerous failure scenarios in a shorter time period. The following estimates the performance time of the exemplary method 200 or similar methods over such a network. In the following, Nb indicates the number of backbone nodes (e.g., backbone nodes 111-117), Nu indicates the number of user nodes (e.g., user nodes 161 and 162), Ns indicates the number of service nodes (e.g., data routing nodes 131-133 and call processing nodes 141 and 142), Mb indicates the number of backbone links between backbone nodes (e.g., backbone links 121-129), Mu indicates the number of access links between user nodes and backbone nodes (e.g., access links 171-173), Ms indicates the number of access links between service nodes and backbone nodes (e.g., access links 151-157), and Nc indicates the number of connections to be evaluated for each call (e.g., the three critical connections for VoIP calls discussed above).

The first part of the initialization process, during which the list of network elements (e.g., nodes) is stored, may be accomplished in $O(Nb+Nu+Ns)$ time. In one exemplary embodiment, the nodes may be stored in arrays representing each type of node. The second part of the initialization process, during which the list of links (e.g., backbone and service links) is stored, may be accomplished in $O(Mb+Mu+Ms)$ time. As above, links may be stored in arrays representing each type of link. For each link between two nodes, the nodes may also be indicated as neighbors of one another in the arrays representing the nodes.

Next, a known fragmentation algorithm for the backbone (e.g., as described above with reference to step 220) may be accomplished in $O(Mb \log Nb)$ time. As previously stated, this may be any of various known algorithms. Afterwards, user and service nodes are allocated to each of the backbone fragments (e.g., colored as described above in step 230). This may be accomplished in $O(Mu+Ms)$ time, as each access link between a backbone node and a user or service node is considered individually. Subsequently, service clusters (e.g., clusters EC1 and EC2) are given appropriate designations (e.g., colored as described above in step 240). This may be accomplished in $O(Ns)$ time, as each service node has its designation (e.g., color) added to the information for the corresponding cluster.

Finally, connectivity is checked for all possible user pairs. It should be apparent that the total number of all possible user pairs is on the order of $Nu^2$. For a single connection, a number of comparisons to determine whether both parties to the connection are linked (e.g., share a common color) is equal to the number of colors (i.e., the number of discovered backbone fragments) that cannot be larger than the number of backbone nodes Nb, and there may be a maximum of Nc connections evaluated to determine whether a call may be completed. It should be noted that it has been assumed, for simplicity, that all connections include two components (e.g., two user nodes, two equipment clusters, or one user node and one equipment cluster). Thus, the evaluation of all possible user pairs may be accomplished in $O(Nc*Nb*Nu^2)$ time. Because the product terms are typically more significant than the sum terms, the total time to validate connectivity for all user pairs in large networks may be estimated as $T1 \approx O(Mb \log Nb) + O(Nc*Nb*Nu^2)$. Further, because $Nu^2 \gg Nb^2 \gg Mb$ for typical service provider networks, for example, this estimate may be simplified to $T1 \approx O(Nc*Nb*Nu^2)$.

In contrast, a commonly-used single-source shortest path Dijkstra algorithm may require $O((Nb+Nu+Ns)^2)$ time to validate a single connection for a modeled call between a single pair of users, $O(Nc*(Nb+Nu+Ns)^2)$ to validate all such per-call connections. Thus, validating all critical connections for all pairs of users using such an algorithm may require $T2 \approx O(Nu^2*Nc*(Nb+Nu+Ns)^2)$. It should be apparent that T1 is much less than T2, and that, accordingly, the exemplary method 200 may achieve a substantial time improvement over such prior methods. This added efficiency improves performance in evaluating application layer connectivity (e.g., network connectivity required to complete different types of calls between two or more network users) in addition to more commonly modeled network layer connectivity (e.g., connectivity between pairs of network nodes).

It should be noted, once again, that the embodiments described above with specific reference to the components and connections of a VoIP communication network are only exemplary. The broader principles of the present invention may be applied to any type of network or graph in which it is desirable to assess connectivity between one or more pairs of points or nodes during one or more fragmentation scenarios. Such networks and graphs may include, but are not limited to, IP data networks, other types of communications networks, transportation networks, social networks and interactive gaming networks.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A non-transitory computer readable storage medium including a set of instructions executable by a processor, the instructions, when executed by the processor, causing the processor to perform operations comprising:

assigning a unique identifier to each of a plurality of node subsets of a network, the node subsets being created by damage to the network;

assigning one of the unique identifiers of the node subsets to each of a plurality of components of the damaged network based on a connectivity to one of the node subsets and corresponding unique identifiers of the node subsets;

assigning one of the unique identifiers of the node subsets to a node type of the plurality of components by assigning the node type all of the unique identifiers of any of the components of the node type;

generating a connectivity map, wherein the connectivity map includes a box with one or more unique identifiers representing each of the plurality of components; and evaluating a first connectivity between a first one of the components and a second one of the components by determining whether they share one of the unique identifiers.

2. The non-transitory computer readable storage medium of claim 1, wherein the damage scenario is one of existing and hypothetical.

3. The non-transitory computer readable storage medium of claim 1, wherein the network is one of a voice over interne protocol network, an IP data network, a communications network, a transportation network, a social network and an interactive gaming network.

4. The non-transitory computer readable storage medium of claim 1, wherein the operations further comprise:
evaluating a second connectivity between the first one of the components and a third and fourth ones of the components by determining whether they share one of the unique identifiers.

5. The non-transitory computer readable storage medium of claim 4, wherein the operations further comprise:
evaluating a third connectivity between the second one of the components and a fifth one of the components by determining whether they share one of the unique identifiers.

6. The non-transitory computer readable storage medium of claim 1, wherein the unique identifiers are one of colors, numbers, letters, words, place names and network component designations.

7. The non-transitory computer readable storage medium of claim 1, wherein the instructions are repeated for a complete set of possible pairs of components of the network.

8. The non-transitory computer readable storage medium of claim 1, wherein the assigning excludes a damaged node of the network.

9. The non-transitory computer readable storage medium of claim 1, wherein the node type is based on a functionality of the components.

10. The non-transitory computer readable storage medium of claim 1, wherein the operations further comprise:
identifying each of the plurality of node subsets.

11. A system, comprising:
a memory including a representation of a plurality of network components and a set of instructions; and
a processor executing the set of instructions to perform operations comprising assigning a unique identifier to each of a plurality of node subsets of the network components, the node subsets comprising undamaged nodes of the network based on a damage scenario, assigning one of the unique identifiers of the node subsets to other network components based on a connectivity to one of the node subsets, assigning one of the unique identifiers of the node subsets to a node type of the other network components based on the unique identifiers assigned to each of the other network components in the node type, generating a connectivity map, wherein the connectivity map includes a box with one or more unique identifiers representing each of the plurality of components, and evaluating a connectivity between a first one of the other network components and a second one of the other network components by determining whether they share one of the unique identifiers.

12. The system of claim 11, wherein the damage scenario is one of existing and hypothetical.

13. The system of claim 11, wherein the plurality of network components comprise one of a voice over internet protocol network, an IP data network, a communications network, a transportation network, a social network and an interactive gaming network.

14. The system of claim 11, wherein the operations further comprise evaluating a second connectivity between the first one of the other network components and a third and fourth ones of the other network components by determining whether they share one of the unique identifiers.

15. The system of claim 14, wherein the operations further comprise evaluating a third connectivity between the second one of the other network components and a fifth one of the other network components by determining whether they share one of the unique identifiers.

16. The system of claim 11, wherein the unique identifiers are one of colors, numbers, letters, words, place names and network component designations.

17. The system of claim 11, wherein the operations further comprise evaluating the connectivity for a complete set of possible pairs of the other network components.

18. The system of claim 11, wherein the assigning excludes damaged network components.

19. The system of claim 11, wherein the subset is based on a functionality of the components.

20. The system of claim 11, wherein the operations further comprise identifying each of the plurality of node subsets.

* * * * *